United States Patent
Andersson et al.

(10) Patent No.: US 10,492,217 B2
(45) Date of Patent: Nov. 26, 2019

(54) RESOURCE SCHEDULING OF UPLINK RESOURCES

(71) Applicant: Telefonaktiebolaget LM Ericsson (publ), Stockholm (SE)

(72) Inventors: Håkan Andersson, Linköping (SE); Andreas Bergström, Vikingstad (SE); Mattias Frenne, Uppsala (SE); Johan Furuskog, Stockholm (SE); Stefan Parkvall, Bromma (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/543,765

(22) PCT Filed: Jun. 30, 2015

(86) PCT No.: PCT/SE2015/050765
§ 371 (c)(1),
(2) Date: Jul. 14, 2017

(87) PCT Pub. No.: WO2016/114699
PCT Pub. Date: Jul. 21, 2016

(65) Prior Publication Data
US 2018/0027584 A1    Jan. 25, 2018

Related U.S. Application Data

(60) Provisional application No. 62/103,744, filed on Jan. 15, 2015.

(51) Int. Cl.
*H04W 72/12* (2009.01)
*H04W 72/04* (2009.01)

(52) U.S. Cl.
CPC ... *H04W 72/1284* (2013.01); *H04W 72/0406* (2013.01); *H04W 72/0446* (2013.01); *H04W 72/1289* (2013.01)

(58) Field of Classification Search
CPC ......... H04W 72/1284; H04W 72/0446; H04W 72/0406
See application file for complete search history.

(56) References Cited

U.S. PATENT DOCUMENTS

2012/0127938 A1* 5/2012 Lv ..................... H04W 72/1205
370/329
2013/0016686 A1* 1/2013 Li ........................ H04L 1/1822
370/329

(Continued)

FOREIGN PATENT DOCUMENTS

EP    2434818 A1    3/2012
EP    2538734 A1    12/2012

(Continued)

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 12)", 3GPP TS 36.212 V12.2.0, Sep. 2014, 1-89.

(Continued)

*Primary Examiner* — Saumit Shah
(74) *Attorney, Agent, or Firm* — Murphy, Bilak & Homiller, PLLC (57) ABSTRACT

The present embodiments herein provide methods, apparatuses and a system for the purpose of scheduling resources to a UE (11) by a network node (12). The UE or CE (11) is configured to receive (210), from the network node (12), a control message, comprising information about a resource allocation as well as an indicator indicating whether a single-subframe scheduling scheme or a multi-subframe (Continued)

scheduling scheme. The CE (11) then retrieves the indicator and act according the information associated with the indicator.

19 Claims, 6 Drawing Sheets

(56) References Cited

U.S. PATENT DOCUMENTS

| | | |
|---|---|---|
| 2014/0301299 A1 | 10/2014 | Wu |
| 2015/0264708 A1* | 9/2015 | Li .......................... H04W 28/06 370/329 |
| 2016/0255650 A1* | 9/2016 | Xia ....................... H04L 1/1822 370/329 |
| 2017/0303306 A1* | 10/2017 | Lee ....................... H04W 72/14 |
| 2018/0027584 A1* | 1/2018 | Andersson ........ H04W 72/1284 |

FOREIGN PATENT DOCUMENTS

| | | |
|---|---|---|
| WO | 2009022314 A2 | 2/2009 |
| WO | 2013167090 A2 | 11/2013 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.3.0, Sep. 2014, 1-124.

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.8.0, Sep. 2014, 1-182.

* cited by examiner

RESOURCE SCHEDULING OF UPLINK RESOURCES

TECHNICAL FIELD

This disclosure generally relates to radio communication. More particularly, the disclosure relates to a scheduling mechanism. The embodiments presented herein relate to an uplink (UL) resource allocation or scheduling method as well as a system for the scheduling of UL resources. This disclosure also presents a network node (e.g. a base station) for the scheduling or allocation of UL resources as well as a corresponding communication equipment (CE), such as a user equipment (UE).

BACKGROUND

Radio communication networks are widely deployed to provide various communication services such as telephony, video, data, messaging, broadcasts, and so on. Such communication networks support communications for multiple communication equipments (CEs) by sharing the available network resources. One example of such a network is the Universal Mobile Telecommunications System (UMTS), a third generation (3G) mobile phone technology standardized by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, third-generation UMTS based on W-CDMA has been deployed in many places the world. To ensure that this system remains competitive in the future, 3GPP began a project to define the long-term evolution of UMTS cellular technology. The specifications related to this effort are formally known as Evolved UMTS Terrestrial Radio Access (E-UTRA) and Evolved UMTS Terrestrial Radio Access Network (E-UTRAN), but are more commonly referred to by the name Long Term Evolution (LTE). More detailed descriptions of radio communication networks and systems can be found in literature, such as in Technical Specifications published by, e.g., the 3GPP. The core network (CN) of the evolved network architecture is sometimes referred to as Evolved Packet Core (EPC) and when referring to a complete cellular system, including both radio access network and core network, as well as other possible entities, such as service related entities, the term Evolved Packet System (EPS) can be used.

Time Division Duplexing (TDD)

In a TDD system, UL and downlink (DL) transmissions occur on the same frequency band but at different time instances. A given subframe may only be allocated for transmission in either UL or DL.

Figure 1:
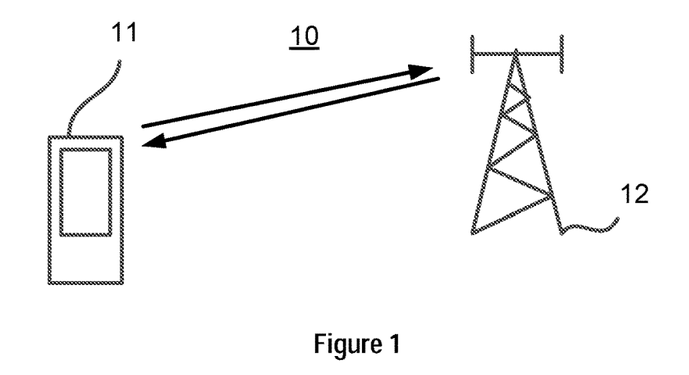
FIG. 1 schematically illustrates a communication device communicating with a base station.

FIG. 1 schematically illustrates a system 10. The system 10 comprises a CE 11 (e.g. a UE) communicating with a network node 12 (e.g. a base station such as eNB) in both UL and DL.

In a static TDD system, a fixed pattern (i.e. TDD configuration) specifies which subframes are designated for UL and DL, respectively.

In a fully dynamic TDD system, there is no fixed pattern that specifies which subframes are designated for UL and DL, respectively. Instead, which subframes that are to be used for UL and DL transmissions is generally decided continuously or "one-the-fly" by a scheduler of a network node (e.g. a base station) depending on the UL/DL traffic pattern. Certain restrictions on what the subframes are used for do apply, however. Some subframes are fixed to be DL subframes to allow transmission of, e.g., DL control information and channel state information-reference symbols (CSI-RS). Other subframes are fixed for UL transmissions of UL control information and/or random-access signaling.

There also exist semi-static TDD systems. In a semi-static TDD system, such as LTE Release 12, it is possible to switch between TDD configurations. This may e.g. be done in a slow time frame using higher-layer signaling. Typically, but not necessarily, the switches may be performed every frame, i.e. every 10 ms.

Multi-Subframe Scheduling

LTE DL was designed so that one scheduling message schedules one data transmission in UL or reception in DL. Multi-subframe scheduling implies that a scheduling message schedules multiple subframes. An example of a multi-subframe scheduling mechanism is described in the United States Patent Application Publication No. US2014/0301299A1. According to the disclosure of US2014/0301299A1, if mobile devices can only be configured for either multi-subframe scheduling or normal signal sub-subframe scheduling, mobile devices configured for only multi-subframe scheduling would not be able to be scheduled for a high quantity of subframes in advance. US2014/0301299A1 suggests solving this potential problem by adding one more flag bit in a Downlink Control Information (DCI) message to indicate whether the single-subframe scheduling scheme or the multi-subframe scheduling scheme is used for this DCI message. The main idea of US2014/0301299A1 is to introduce a multi-subframe scheduling activation pattern over RRC (abbreviation for Radio Resource Control). This bitmap pattern points out special subframes for which the UE shall assume that the received DCI message is valid for N>1 subframes instead of only this subframe. This behavior is also on/off-controlled by a flag bit in the RRC. So if the flag is on (i.e., enabled) and the bitmap over RRC is 0100010010 and N=2, this would that scheduling in subframe 2, 6 and 9 is also valid for subframes 3, 7, 10.

In fully dynamic TDD and in a scenario with a high demand of UL-subframes there may be a single DL subframe followed by n consecutive UL subframes, where n may be on the order of several tens. In this scenario, all n UL subframes must be scheduled by the base station and granted to a communication equipment, such as a user equipment (UE), in said single DL subframe. This is another example of multi-subframe scheduling. The resource allocation granted to the UE is then applied to all subsequent UL subframes and is valid until a new UL grant is received by the communication equipment.

In DL, multi-subframe scheduling is not as much of an issue as it is for UL. If a given subframe is used for DL there can also be a DL grant transmitted on the EPDCCH, which details the resource allocation of the PDSCH transmission. A potential advantage of using multi-subframe scheduling on DL would be that fewer grants need to be transmitted and space can be saved on the EPDCCH.

In UL, the advantages of multi-subframe scheduling are even more accentuated. When scheduling UL transmissions when multi-subframe scheduling cannot be used, a new UL grant has to be transmitted on a DL control channel, e.g., the EPDCCH. This forces a DL transmission using a DL subframe, which in an UL-heavy scenario may be very wasteful since this subframe cannot convey any UL data.

Beamforming

In evolved LTE and future 5G systems the technology of beamforming is envisioned to become a key component. Through the use of array antennas the transmitted and/or received signal can be steered in specific directions. Beamforming comes in two distinct variants with some key differences. The most advanced, and also most demanding when it comes to processing requirements, is typically referred to as "digital beamforming". This enables individual PRBs to be steered in a desired direction without dependencies to other PRBs and their beam directions. Hence, digital beamforming makes CE-specific beam-steering possible. There also exists a beamforming technique known as "analog beamforming", which only enables the entire bandwidth, i.e., all PRBs, to be steered in the same direction. Hence, no CE-specific beam-steering is possible. Typically, it is possible to transmit/receive a small number of different analog beams in a given subframe. However, the number of beams available is normally quite limited; say in the order of eight.

SUMMARY

It is in view of the above considerations and others that the various embodiments disclosed herein have been made.

In one of its aspects, the technology presented herein concerns a method performed by a CE (communication equipment), such as a UE. The method comprises receiving, from a network node such as a base station (e.g. an eNB), a control message e.g. The control message includes a resource allocation field comprising information about a resource allocation. The control message also includes an indicator indicating whether a single-subframe scheduling scheme or a multi-subframe scheduling scheme is to be used. The method also comprises retrieving the indicator from the received control message. In response to the indicator indicating that a single-subframe scheduling scheme is to be used, the method further comprises interpreting the resource allocation field to mean a resource allocation in a frequency domain. In response to the indicator indicating that a multi-subframe scheduling scheme is to be used, the method further comprises interpreting the resource allocation field to mean a resource allocation in a time domain for at least one subframe. Still further, the method comprises transmitting uplink data to the network node in accordance with the interpreted resource allocation.

In another of its aspects, the technology presented herein concerns a method performed by a network node such as a base station (e.g., an eNB) for scheduling of UL resources. The method comprises including a resource allocation field into a control message, the resource allocation field comprising information about a resource allocation. The method additionally comprises including an indicator into the control message, the indicator indicating whether a single-subframe scheduling scheme or a multi-subframe scheduling scheme is to be used for the control message. Furthermore, the method comprises transmitting the control message including the resource allocation field as well as the indicator to a CE, such as a UE.

In a further of its aspects, the technology presented herein concerns a computer program comprising instructions which when executed on at least one processor of an apparatus causes the apparatus to perform, or execute, a method according to any one of the above-mentioned aspects. A carrier comprising said computer program is also provided, wherein the carrier may be one of the following: an electronic signal, an optical signal, a radio signal, or a computer readable storage medium.

In still another of its aspects, the technology presented herein concerns a CE comprising a processor and a memory, wherein the memory comprises instructions executable by the processor whereby the CE is operative to: receive, from a network node, a control message, wherein the control message includes a resource allocation field comprising information about a resource allocation as well as an indicator indicating whether a single-subframe scheduling scheme or a multi-subframe scheduling scheme is to be used; retrieve the indicator from the received control message; in response to the indicator indicating that a single-subframe scheduling scheme is to be used, interpret the resource allocation field to mean a resource allocation in a frequency domain; else in response to the indicator indicating that a multi-subframe scheduling scheme is to be used, interpret the resource allocation field to mean a resource allocation in a time domain for at least one subframe; and transmit uplink data to the network node in accordance with the interpreted resource allocation.

In yet another of its aspects, the technology presented herein concerns a network node such as base station (e.g. eNB) for scheduling of UL resources. The network node comprises a processor and a memory, wherein the memory comprises instructions executable by the processor whereby the network node is operative to: include a resource allocation field into a control message, the resource allocation field comprising information about a resource allocation; include an indicator into the control message, the indicator indicating whether a single-subframe scheduling scheme or a multi-subframe scheduling scheme is to be used for the control message; and transmitting the control message including the resource allocation field as well as the indicator to a CE.

In a further of its aspects, the technology presented in this disclosure concerns a UL resource scheduling method. The method comprises:
  a network node including a resource allocation field into a control message, the resource allocation field comprising information about a resource allocation;
  the network node additionally including an indicator into the control message, the indicator indicating whether a single-subframe scheduling scheme or a multi-subframe scheduling scheme is to be used for the control message; and
  the network node transmitting the control message including the resource allocation field as well as the indicator to a CE;
  the CE receiving the control message from the network node;
  the CE retrieving the indicator from the received control message;
  in response to the indicator indicating that a single-subframe scheduling scheme is to be used, the CE interpreting the resource allocation field to mean a resource allocation in a frequency domain; else in response to the indicator indicating that a multi-subframe scheduling scheme is to be used, the CE interpreting the resource allocation field to mean a resource allocation in a time domain for at least one subframe;

the CE transmitting uplink data to the network node in accordance with the interpreted resource allocation; and the network node receiving, from the CE, an UL transmission in accordance with the earlier-transmitted control message.

In another of its aspects, the technology presented herein concerns a system for scheduling UL resources. The system comprises a network node such as a bases station (e.g. eNB) and a CE such as a UE. The network node is adapted to include a resource allocation field into a control message, the resource allocation field comprising information about a resource allocation. The network node is also adapted to include an indicator into the control message, the indicator indicating whether a single-subframe scheduling scheme or a multi-subframe scheduling scheme is to be used for the control message. Furthermore, the network node is adapted to transmit the control message including the resource allocation field as well as the indicator to a CE. The CE is adapted to receive the control message from the network node. The CE is also adapted to retrieve the indicator from the received control message. In response to the indicator indicating that a single-subframe scheduling scheme is to be used, the CE is further adapted to interpret the resource allocation field to mean a resource allocation in a frequency domain. In response to the indicator indicating that a multi-subframe scheduling scheme is to be used, the CE is further adapted to interpret the resource allocation field to mean a resource allocation in a time domain for at least one subframe. Moreover, the CE is adapted to transmit uplink data to the network node in accordance with the interpreted resource allocation. The network node is further adapted to receive, from the CE, an UL transmission in accordance with the earlier-transmitted control message.

The technology presented in this disclosure provides a number of advantages, e.g. one or more of the advantages listed in the following list of non-exhaustive list of example advantages:

It introduces a more flexible interpretation of the resource allocation field in the control message (e.g. UL grant or DCI message) in LTE to enable multi-subframe scheduling that can accommodate different resource allocations between various subframes.

It allows for an increasingly flexible resource allocation format that allows different allocations in different subframes, all of which are conveyed through the same UL grant. This enables the creation of "holes" which can be utilized by other UL channels. At the same time, this may give a time-dimension to the UL scheduling without having to transmit multiple UL grants.

Moreover, one or more of the earlier-mentioned challenges may be addressed.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION OF EMBODIMENTS

The technology will now be described more fully hereinafter with reference to the accompanying drawings, in which certain embodiments are shown. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

As previously explained, one challenge with multi-subframe scheduling of UL, e.g. PUSCH, based on a single grant is the fact that some subframes may have resources reserved for other physical channels, e.g., the EPUCCH or PRACH. The resource allocation given in the grant could be applied to most of the subframes but for some subframes a modified resource allocation may be necessary. Generally, this cannot be achieved with the current resource allocation formats in LTE.

A further challenge is present in prior art systems that use analog beamforming. In such a system it may not always be advantageous to schedule many CEs in the same subframe because the CEs are located in different directions and would be best served by beams pointing in different directions. The limiting factor on number of CEs that is meaningful to schedule in the same subframe may rather be the number of analog beams available for reception at the eNB. In such a scenario, there is currently no mechanism available for multi-subframe scheduling that allows a single UL grant to specify that a UE should only be scheduled in every $n^{th}$ subframe, where a suitable analog beam is available.

Still further, the prior art does not provide a mechanism available to create frequency diversity over time in a multi-subframe scheduling situation. It is not very likely that the future channel properties are known when scheduling PUSCH with a multi-subframe grant. In such a scenario, it might be beneficial to be able to change the resource allocation from subframe to subframe in order to create a frequency-diversity scheme. This would be beneficial in combination with coding over multiple subframes, e.g., in the form of transmitting different Redundancy Versions (RV) of the same HARQ process.

In the following will be described the exemplary embodiments solving the above problems in conjunction with the accompanying figures.

Figure 2:
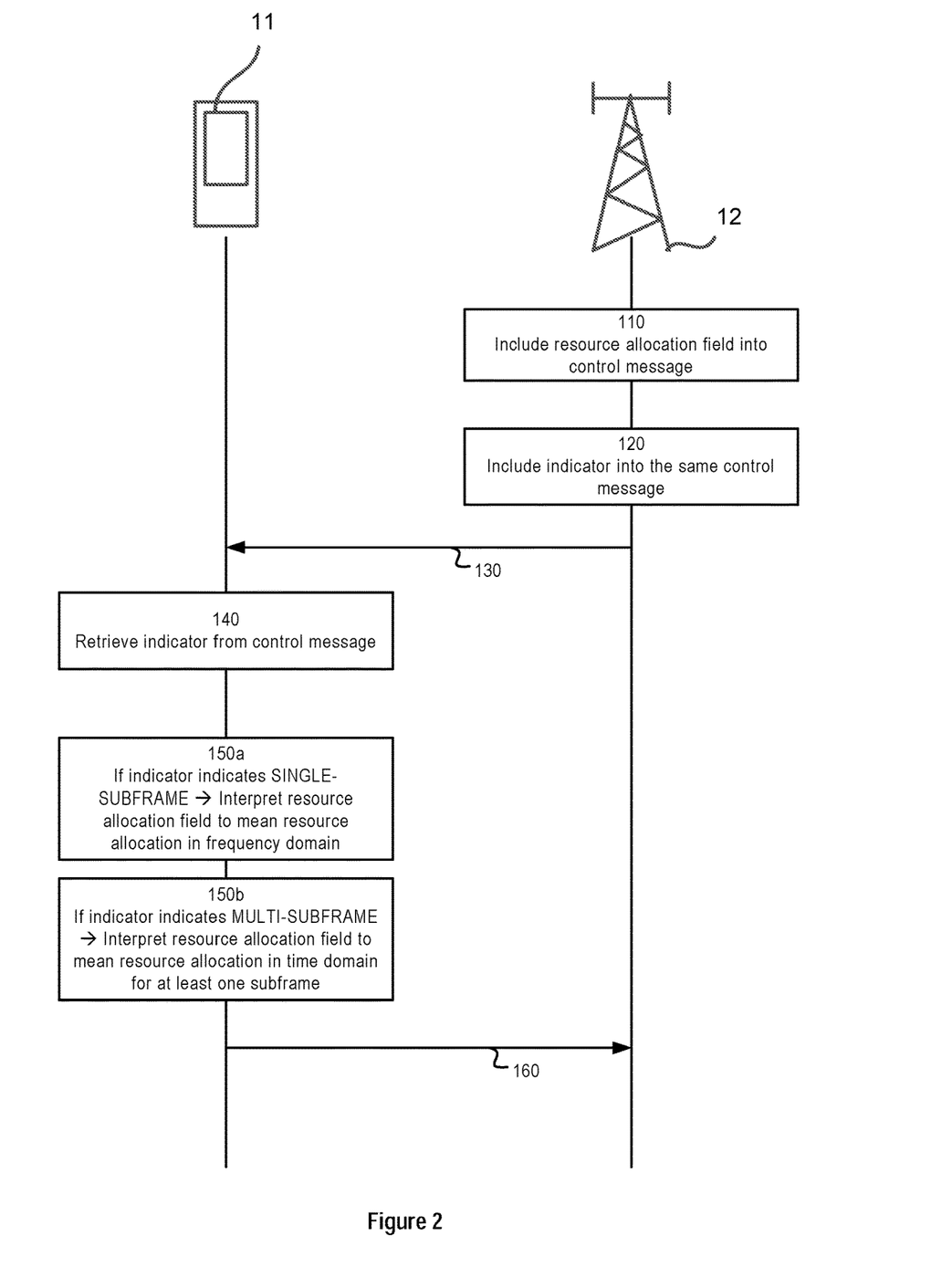
FIG. 2 schematically illustrates a flowchart of a UL resource scheduling method in accordance with an example embodiment.

FIG. 2 illustrates a flowchart of an example embodiment of method for scheduling UL resources. A network node 12 includes 110 a resource allocation field into a control message, the resource allocation field comprising information about a resource allocation. The network node 12 also includes 120 an indicator into the control message, the indicator indicating whether a single-subframe scheduling scheme or a multi-subframe scheduling scheme is to be used for the control message. The network node 12 further transmits 130, i.e. sends, the control message including the resource allocation field as well as the indicator to a CE 11. The CE 11 thus receives 130 the control message from the network node 12. The CE 11 also retrieves 140 the indicator from the received control message. In response to the indicator indicating that a single-subframe scheduling scheme is to be used, the CE 11 interprets 150a the resource allocation field to mean a resource allocation in a frequency domain. Else, in response to the indicator indicating that a multi-subframe scheduling scheme is to be used, the CE 11 interprets 150b the resource allocation field to mean a resource allocation in a time domain for at least one subframe. The CE 11 also transmits 160 uplink data to the network node 12 in accordance with the interpreted resource allocation. Accordingly, the network node 12 receives 160, from the CE, an UL transmission in accordance with the earlier-transmitted control message. This may allow for an increasingly flexible resource allocation format that allows for different allocations in different subframes.

Figure 3:
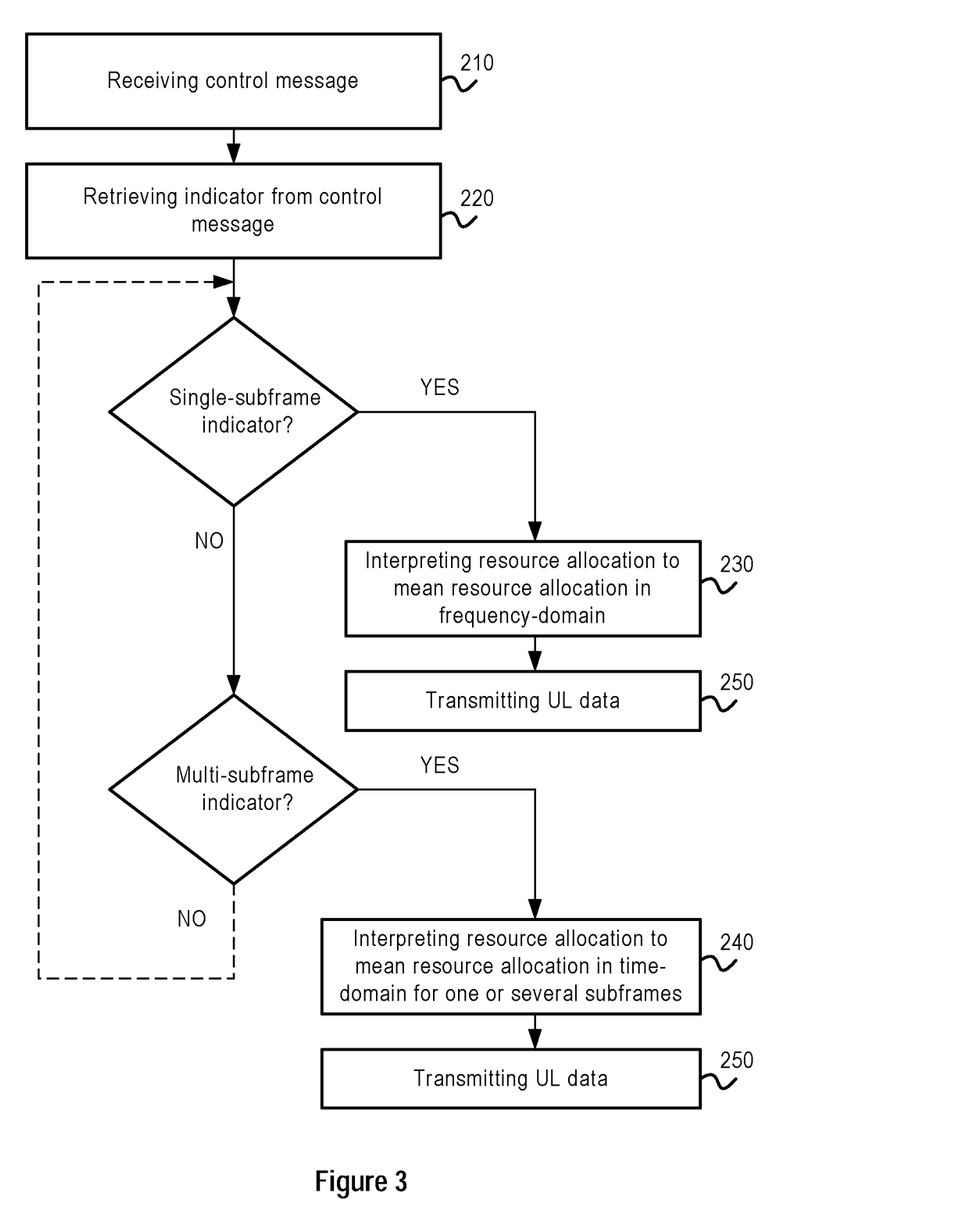
FIG. 3 schematically illustrates a flowchart of a method performed by communication equipment, in accordance with an example embodiment.

FIG. 3 illustrates a flowchart of an example embodiment of method performed by a communication equipment (CE) such as a UE. A control message is received 210 from a network node, such as a base station. The base station may be an eNB. The above-mentioned control message may be a downlink control signaling message, such as a Downlink Control Information (DCI) message. Furthermore, the control message includes a resource allocation field. The resource allocation filed may comprise information about a resource allocation. Alternatively, the resource allocation field indicates said resource allocation. Moreover, the control message includes an indicator indicating whether a single-subframe scheduling scheme or, alternatively, a multi-subframe scheduling scheme is to be used. Next, the indicator is retrieved 220 or otherwise obtained from the received control message. Subsequently, it is checked whether the indicator indicates whether a single-subframe scheduling scheme or a multi-subframe scheduling scheme is to be used. In response to the indicator indicating that a single-subframe scheduling scheme is to be used, the resource allocation field is interpreted 230 to mean that resource allocation shall be made in the frequency domain. Else, in response to the indicator indicating that a multi-subframe scheduling scheme is to be used, the resource allocation field is instead interpreted 240 to mean that the resource allocation is to be made in the time domain for at least one subframe, i.e. for one or more subframes. In some embodiments, if the indicator indicates that a multi-subframe scheduling scheme is to be used, the method may additionally comprise determining that some resource allocation bits are to be used for scheduling in the frequency domain, and determining that the remaining resource allocation bits are to be used for scheduling in the time domain. Thus, some resource allocation bits are used for scheduling in the frequency domain whereas some (i.e., other) resource allocation bits are used for scheduling in the time domain. This may allow for an increasingly flexible resource allocation format that allows for different allocations (frequency domain vs. time domain) for different subframes. Various detailed examples will be presented later herein. Finally, uplink data is transmitted 250 to the network node in accordance with the interpreted resource allocation.

Figure 4:
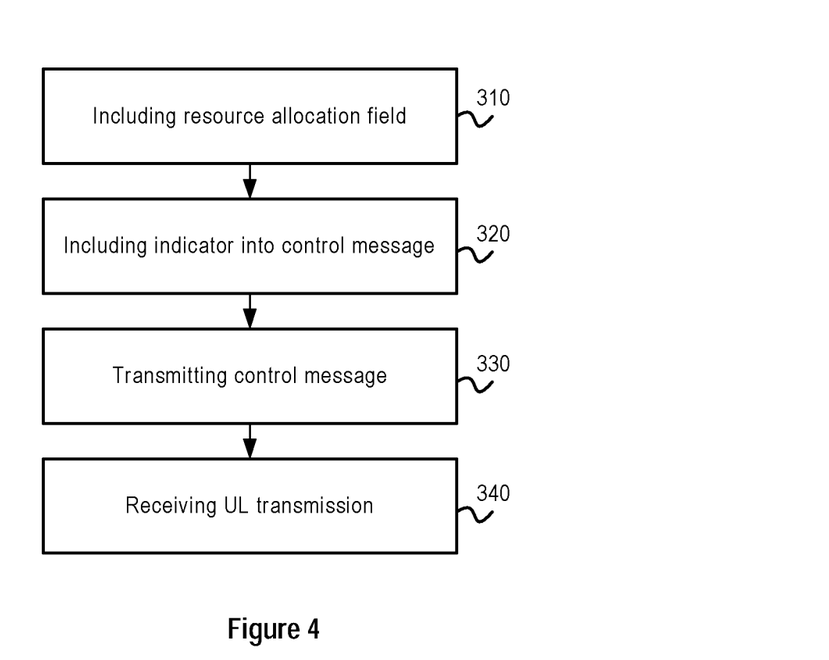
FIG. 4 schematically illustrates a flowchart of a method performed by a network node, in accordance with an example embodiment.

FIG. 4 illustrates a flowchart of an example embodiment of method performed by a network node such as a base station (e.g., a eNB). The method is suitable for scheduling of UL resources. The method may comprise including 310 a resource allocation field into a control message, the resource allocation field comprising information about (or otherwise indicating) a resource allocation. In some embodiments, a control message already includes or comes with the resource allocation field. Thus, this field may be said to be a pre-defined field of the control message. It should be appreciated that the control message may be a downlink control signaling message such as DCI message. The method comprises including 320 an indicator into the control message, the indicator indicating whether a single-subframe scheduling scheme or a multi-subframe scheduling scheme is to be used for the control message. Furthermore, the method comprises transmitting 330 the control message including the resource allocation field as well as the indicator to a CE, such as a UE. Moreover, the method may comprise receiving 340, from the CE, an UL transmission in accordance with the transmitted control message.

The actions, or method steps, described in connection with FIGS. 2, 3 and 4 have been described in a certain order. However, it should be appreciated that the actions, or method steps, described in connection with these figures do not necessarily have to be performed, or executed, in the described order.

Various Detailed Examples of UL Resource Scheduling

Various detailed examples of the UL resource scheduling methods will now be described in further detail.

The existing UL grant formats generally comprise the UL resource allocation in the form of a number of bits that specify the frequency-domain (RB) allocation. This UL resource allocation can be used for multi-subframe scheduling by applying it repeatedly to subsequent subframes in the case an indicator, e.g. in the form of a flag (or, similar), indicates to the CE that the scheduling message is valid for N>1 subframes.

Figure 5:
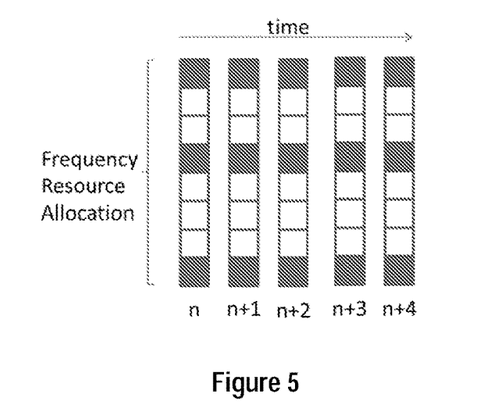
FIG. 5 schematically illustrates an example of multi-subframe scheduling where grey-marked squares indicate scheduled resources.

FIG. 5 schematically illustrates an example where the DCI message using 8 bits for frequency-resource allocation schedules frequency resources (which could correspond to resource blocks or resource block groups as specified in LTE) 0, 4 and 7 in subframe n and the same resources are then assumed to be scheduled in the following four subframes (N=5). The selection of resources 0, 4 and 7 in subframe n is based on frequency-selective CSI feedback from the CE, and hence these are the selected resources with a good, or proper, channel to the CE.

Due to the time-varying fading of the channel, a benefit of using the given frequency resources (0, 4 and 7 in this example) is reduced over time since in, e.g., subframe n+3 some other frequency resources would potentially be better.

In one example embodiment, the existing resource allocation formats can be reused but reinterpreted to inform the CE that the resource allocation is different between subframes when used for multi-subframe scheduling.

For example, and in accordance with one embodiment, when multi-subframe scheduling is enabled (e.g., by an indicator such as a flag in the DCI format), the N resource allocation bits are split into two parts, Nf and Nt, where N=Nf+Nt. The Nf bits are used for frequency scheduling while Nt bits are used for time (subframe) scheduling. Hence, the same frequency resources are scheduled in every subframe that is indicated by the time-scheduling indicator bits.

Consequently, parts of the frequency-resource allocation bits are re-interpreted as time-resource allocation while at the same time the resource granularity in frequency domain can be lowered.

Figure 6:
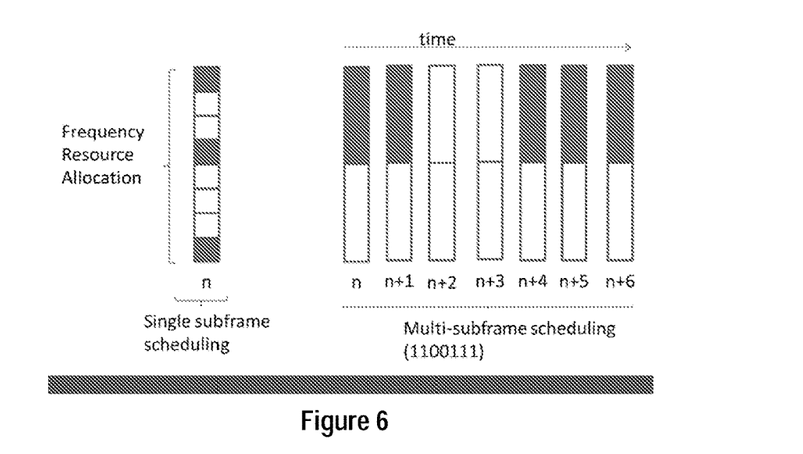
FIG. 6 schematically illustrates Single and Multi-subframe scheduling in an embodiment where frequency granularity is reduced when multi-subframe scheduling is enabled.

In the example of FIG. 6, where N=8 bits are used for frequency-resource allocation in single-subframe scheduling mode, Nf=1 bit is indicating the frequency allocation while the remaining Nt=7 bits are used to indicate time scheduling (one bit per subframe) in case of multi-subframe scheduling mode. When scheduling over multiple subframes accurate frequency resolution may be less beneficial (and it may decrease with the number of multi-scheduled subframes N) and therefore fewer information bits are used for this information in the proposed embodiment. In the extreme case Nf=0 bits are applied to the frequency domain so that all resource allocation bits apply to the time-domain scheduling. In this case the frequency-domain resources can be configured semi-statically by higher-layer signaling or the full bandwidth can be assumed. Alternatively, the resource allocation in the frequency domain can be given by a pre-determined pattern, and change, or hop, for each subframe so that randomization of the channel may occur. Different CEs may then have orthogonal resource-allocation patterns in the frequency domain in a given subframe so that multiple CEs can be scheduled. In this case, the scheduling bandwidth may be controlled by signaling in higher layers, e.g. RRC.

Figure 7:
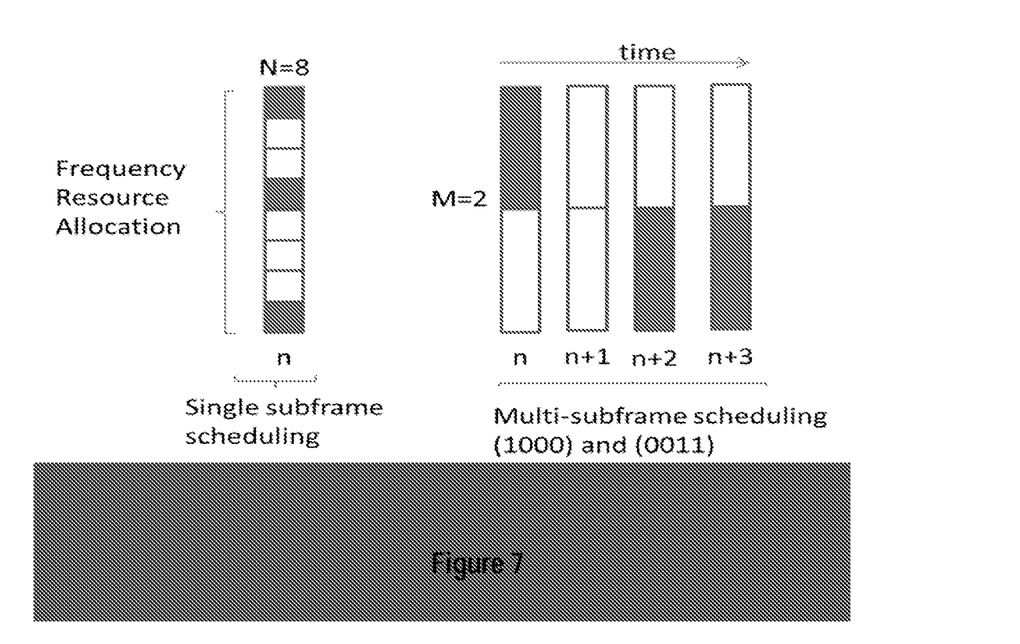
FIG. 7 schematically illustrates an alternative embodiment.

In another example embodiment, the N bits used for resource allocation may be split into M groups. The N/M bits in each group may point out the time allocation for each frequency group. This is typically frequency-contiguous or with very coarse resolution since the number of bits is rather limited. The value of M could, e.g., be RRC-configured or given by a separate bit field in the UL grant. The advantage of this embodiment is that it is possible to have different frequency resources scheduled in different subframes of the multi-subframe scheduling grant. See FIG. 7 for an example with N=8, M=2.

In yet an alternative embodiment, the allocation of the first group is applied to subframes n, n+M, n+2M, . . . , the second group to subframes n+1, n+M+1, n+2M+1, . . . and so on.

In still another embodiment, the Redundancy Version information (RV, 2 bits in LTE) of the scheduling grant may replace the resource block assignment in the above embodiments. By this it is meant that it will also be beneficial to be able to apply different RVs to different subframes according to the mechanisms described in the various embodiments outlined herein. This would typically be used when some subframes comprise retransmissions of previously transmitted data. This can also be combined with the subframe-specific frequency-domain resource allocation described above.

Note that the above-mentioned embodiments in principle also work for the DL resource allocation formats. However, as noted in the background section, the potential gains may be smaller since in a subframe used for PDSCH the penalty for including a DL grant on the EPDCCH is not as severe as it is for the UL situation.

Figure 8:
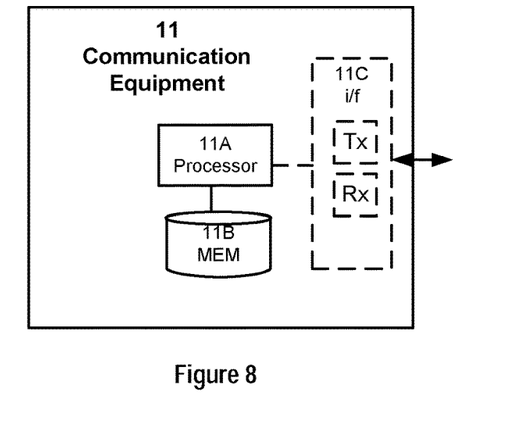
FIGS. 8-9 present communication equipment according to exemplary embodiments.

Turning now to FIG. 8, a CE 11 such as UE will be described. As used in this disclosure, the term UE is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, a computer, a laptop computer, a tablet computer, etc. etc. Also, it should be appreciated that the term CE includes MTC devices, which do not necessarily involve human interaction.

The CE 11 comprises a processor 11A and a memory 11B. Also, a communications interface 11C may be provided in order to allow the CE 11 to communicate with network nodes, etc. To this end, the communications interface 11C may comprise a transmitter (Tx) and a receiver (Rx). Alternatively, the communications interface 11C may comprise a transceiver (Tx/Rx) combining both transmission and reception capabilities. The communications interface 11C may include a radio frequency (RF) interface allowing the CE 11 to communicate with network nodes etc through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera.

In one embodiment, the memory 11B comprises instructions which are executable by the processor 11A whereby the CE 11 is operative to: receive, from a network node (e.g., via i/f 11C), a control message, wherein the control message includes a resource allocation field comprising information about a resource allocation as well as an indicator indicating whether a single-subframe scheduling scheme or a multi-subframe scheduling scheme is to be used; retrieve the indicator from the received control message; in response to the indicator indicating that a single-subframe scheduling scheme is to be used, interpret the resource allocation field to mean a resource allocation in a frequency domain; and in response to the indicator indicating that a multi-subframe scheduling scheme is to be used, interpret the resource allocation field to mean a resource allocation in a time domain for at least one subframe; and transmit (e.g., via the i/f 11C) uplink data to the network node in accordance with the interpreted resource allocation. Additionally, the memory 11B may comprise instructions executable by the processor 11A whereby the CE 11 is operative to, in response to the indicator indicating that a multi-subframe scheduling scheme is to be used: determine that some resource allocation bits are to be used for scheduling in the frequency domain; and determine that the remaining resource allocation bits are to be used for scheduling in the time domain. As described earlier, the above-mentioned control message may be a downlink control signaling message, e.g. a downlink control information (DCI) message which is transmitted from the base station or network node to the UE.

Figure 9:
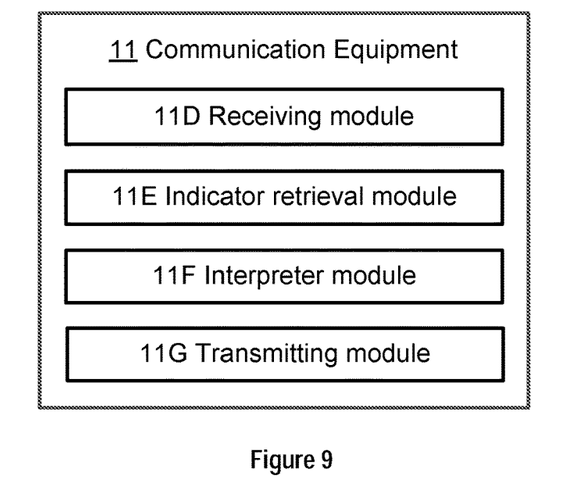

FIG. 9 schematically illustrates an alternative embodiment of a CE 11. The 11 comprises a receiving module 11D, or unit, adapted to receive (from a network node) a control message, wherein the control message includes a resource allocation field comprising information about a resource allocation as well as an indicator indicating whether a single-subframe scheduling scheme or a multi-subframe scheduling scheme is to be used. Also, a indicator retrieval module 11E e.g. a processing unit/circuit or a processing module, or unit, may be provided. The indicator retrieval module 11E is adapted to retrieve the indicator from the received control message. The CE 11 also includes an interpreter module 11F, or unit. In response to the indicator indicating that a single-subframe scheduling scheme is to be used, the interpreter module 11F is adapted to interpret the resource allocation field to mean a resource allocation in a frequency domain. Else, in response to the indicator indicating that a multi-subframe scheduling scheme is to be used, the interpreter module 11F is adapted to interpret the resource allocation field to mean a resource allocation in a time domain for at least one subframe. Also, a transmitting module 11G, or unit, is adapted to transmit uplink data to the network node in accordance with the interpreted resource allocation. The indicator retrieval module 11E may be part of a processing module, or unit, of the CE 11. Likewise, the interpreter module 11F may be part of a processing module, or unit, of the CE 11. The CE may also comprise a memory module, or unit (not shown).

Figure 10:
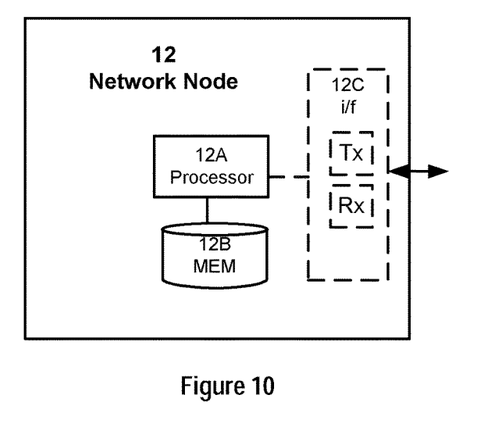
FIGS. 10-11 present network nodes according to exemplary embodiments.

Turning now to FIG. 10, a network node 12 will be described. As used herein, the term "network node" may denote any fixed point being capable of communicating with the CE. As such, it may be referred to as a base station, a radio base station, a NodeB or an evolved NodeB (eNB), a Radio Network Controller (RNC), access point, etcetera.

The network node 12 comprises a processor 12A and a memory 12B. Also, a communications interface 12C may be provided in order to allow the network node 12 to communicate with CEs, etc. To this end, the communications interface 11C may comprise a transmitter (Tx) and a receiver (Rx). Alternatively, the communications interface 12C may comprise a transceiver (Tx/Rx) combining both transmission and reception capabilities. The communications interface 12C may include a radio frequency (RF) interface allowing the network node 12 to communicate with CEs etc through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera.

In one embodiment, the memory 12B comprises instructions which are executable by the processor 12A whereby the network node 12 is operative to: include a resource allocation field into a control message, the resource allocation field comprising information about (or otherwise indicating) a resource allocation; include an indicator into the control message, the indicator indicating whether a single-subframe scheduling scheme or a multi-subframe scheduling scheme is to be used for the control message; and transmitting (e.g., by means of the communications interface 12C) the control message including the resource allocation field as well as the indicator to a CE. The memory 12B may also comprise instructions which are executable by the processor 12A whereby the network node 12 is operative to: receive, from the CE (e.g., by means of the communications interface 12C), an UL transmission in accordance with the transmitted control message. Again, the aforementioned control message may be a downlink control signaling message. This downlink control signaling message may be a DCI message.

Figure 11:
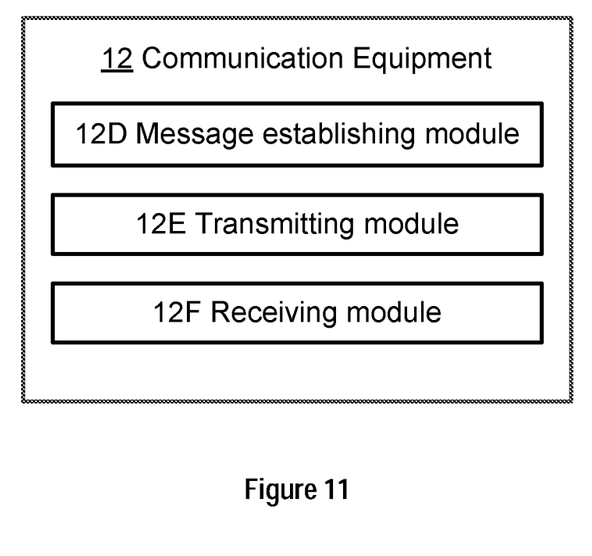

FIG. 11 schematically illustrates an alternative embodiment of a network node 12. The network node 12 comprises a message establishing module 12D e.g. a processing unit/circuit or a processing module, adapted to include a resource allocation field into a control message. The resource allocation field comprises information about a resource allocation, or otherwise indicates the resource allocation. The message establishing module 12D is further adapted to include an indicator into the control message. This indicator indicates whether a single-subframe scheduling scheme or a multi-subframe scheduling scheme is to be used for the control message. Furthermore, a transmitting module 12E, or unit, is provided. The transmitting module 12E is adapted to transmit the control message including the resource allocation field as well as the indicator to a CE. Still further, a receiving module 12F, or unit, may be provided. The receiving module 12F is adapted to receive, from the CE, an UL transmission in accordance with the transmitted control message.

Figure 12:
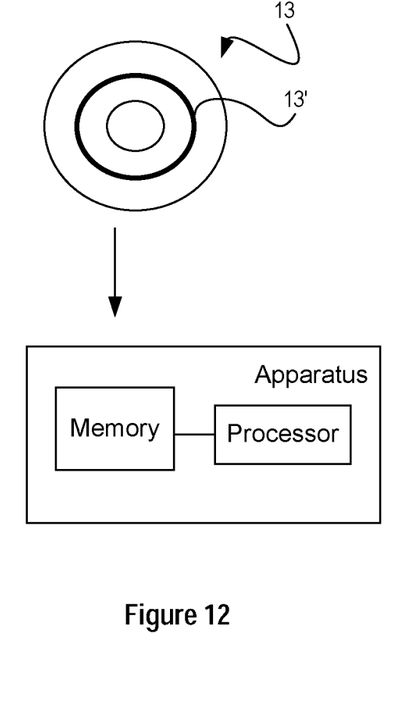
FIG. 12 present a carrier comprising computer program according to an exemplary embodiment.

FIG. 12 shows an example of a computer-readable medium, in this example in the form of a data disc 13. In one embodiment the data disc 13 is a magnetic data storage disc. The data disc 13 is configured to carry instructions 13' that when loaded into a processor of an apparatus, executes a method or procedure according to the any one of the embodiments disclosed in this disclosure. The data disc 13' is arranged to be connected to or within and read by a reading device (not shown), for loading the instructions into the processor. One such example of a reading device in combination with one (or several) data disc(s) 13 is a hard drive. It should be noted that the computer-readable medium can also be other mediums such as compact discs, digital video discs, flash memories or other memory technologies commonly used. In such an embodiment the data disc 13 is one type of a tangible computer-readable medium. The instructions may alternatively be downloaded to a computer data reading device, such as a computer or other apparatus capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

The invention claimed is:

1. A method performed by a communication equipment (CE) the method comprising:
   receiving, from a network node, a control message, wherein the control message includes a resource allocation field comprising information about a resource allocation as well as an indicator indicating whether a single-subframe scheduling scheme or a multi-subframe scheduling scheme is to be used;
   retrieving the indicator from the received control message;
   in response to the indicator indicating that a single-subframe scheduling scheme is to be used, interpreting the resource allocation field to mean a resource allocation in a frequency domain; else
   in response to the indicator indicating that a multi-subframe scheduling scheme is to be used:
      determining that some resource allocation bits of the resource allocation field are to be used for scheduling in the frequency domain; and
      determining that the remaining resource allocation bits of the resource allocation field are to be used for scheduling in the time domain;
      and
   transmitting uplink data to the network node in accordance with the resource allocation field.

2. The method of claim 1, wherein the control message is a downlink control signaling message.

3. The method of claim 2, wherein the downlink control signaling message is a Downlink Control Information (DCI) message.

4. A method performed by a network node for scheduling of uplink (UL) resources, the method comprising:
including an indicator into a control message, the indicator indicating that a multi-subframe scheduling scheme is to be used for the control message, rather than a single-subframe scheduling scheme used for other control messages;
including a resource allocation field into the control message, the resource allocation field comprising information about a resource allocation and comprising some resource allocation bits to be used for scheduling in the frequency domain and comprising remaining resource allocation bits to be used for scheduling in the time domain; and
transmitting the control message including the resource allocation field as well as the indicator to a communication equipment (CE).

5. The method of claim 4, further comprising:
receiving, from the CE, an UL transmission in accordance with the transmitted control message.

6. The method of claim 4, wherein the control message is a downlink control signaling message.

7. The method of claim 6, wherein the downlink control signaling message is a Downlink Control Information (DCI) message.

8. A communication equipment (CE) comprising a processor and a memory, wherein the memory comprises instructions executable by the processor whereby the CE is operative to:
receive, from a network node, a control message, wherein the control message includes a resource allocation field comprising information about a resource allocation as well as an indicator indicating whether a single-subframe scheduling scheme or a multi-subframe scheduling scheme is to be used;
retrieve the indicator from the received control message;
in response to the indicator indicating that a single-subframe scheduling scheme is to be used, interpret the resource allocation field to mean a resource allocation in a frequency domain; else
in response to the indicator indicating that a multi-subframe scheduling scheme is to be used:
determine that some resource allocation bits of the resource allocation field are to be used for scheduling in the frequency domain; and
determine that the remaining resource allocation bits of the resource allocation field are to be used for scheduling in the time domain; and
transmit uplink data to the network node in accordance with the resource allocation field.

9. The CE of claim 8, wherein the control message is a downlink control signaling message.

10. The CE of claim 9, wherein the downlink control signaling message is a Downlink Control Information (DCI) message.

11. The CE of claim 8, wherein the CE is a user equipment (UE).

12. A network node for scheduling of uplink (UL) resources, the network node comprising a processor and a memory, wherein the memory comprises instructions executable by the processor whereby the network node is operative to:
include an indicator into a control message, the indicator indicating that a multi-subframe scheduling scheme is to be used for the control message, rather than a single-subframe scheduling scheme used for other control messages;
include a resource allocation field into the control message, the resource allocation field comprising information about a resource allocation and comprising some resource allocation bits to be used for scheduling in the frequency domain and comprising remaining resource allocation bits to be used for scheduling in the time domain; and
transmit the control message including the resource allocation field as well as the indicator to a communication equipment (CE).

13. The network node of claim 12, wherein the memory comprises instructions executable by the processor whereby the network node is operative to:
receive, from the CE, an UL transmission in accordance with the transmitted control message.

14. The network node of claim 12, wherein the control message is a downlink control signaling message.

15. The network node of claim 14, wherein the downlink control signaling message is a Downlink Control Information (DCI) message.

16. The network node of claim 12, wherein the network node is a base station.

17. The network node of claim 16, wherein the base station is an evolved NodeB (eNB).

18. An uplink (UL) resource scheduling method, comprising:
a network node including a resource allocation field into a control message, the resource allocation field comprising information about a resource allocation;
the network node including an indicator into the control message, the indicator indicating whether a single-subframe scheduling scheme or a multi-subframe scheduling scheme is to be used for the control message; and
the network node transmitting the control message including the resource allocation field as well as the indicator to a communication equipment (CE);
the CE receiving the control message from the network node;
the CE retrieving the indicator from the received control message;
in response to the indicator indicating that a single-subframe scheduling scheme is to be used, the CE interpreting the resource allocation field to mean a resource allocation in a frequency domain; else
in response to the indicator indicating that a multi-subframe scheduling scheme is to be used:
the CE determining that some resource allocation bits of the resource allocation field are to be used for scheduling in the frequency domain; and
the CE determining that the remaining resource allocation bits of the resource allocation field are to be used for scheduling in the time domain;
the CE transmitting uplink data to the network node in accordance with the resource allocation field; and
the network node receiving, from the CE, an UL transmission in accordance with the earlier-transmitted control message.

19. A system for scheduling uplink (UL) resources, the system comprising:
a network node configured to include a resource allocation field into a control message, the resource allocation field comprising information about a resource allocation;

the network node also being configured to include an indicator into the control message, the indicator indicating whether a single-subframe scheduling scheme or a multi-subframe scheduling scheme is to be used for the control message; and the network node further being configured to transmit the control message including the resource allocation field as well as the indicator to a communication equipment (CE); and the CE, configured to receive the control message from the network node;

the CE also being configured to retrieve the indicator from the received control message;

the CE being further configured to, in response to the indicator indicating that a single-subframe scheduling scheme is to be used, interpret the resource allocation field to mean a resource allocation in a frequency domain; else the CE being further configured to, in response to the indicator indicating that a multi-subframe scheduling scheme is to be used:

determine that some resource allocation bits of the resource allocation field are to be used for scheduling in the frequency domain; and     determine that the remaining resource allocation bits of the resource allocation field are to be used for scheduling in the time domain;

the CE also being configured to transmit uplink data to the network node in accordance with the resource allocation field; and the network node being configured to receive, from the CE, an UL transmission in accordance with the earlier-transmitted control message.

* * * * *